(12) United States Patent
Na

(10) Patent No.: US 8,752,576 B2
(45) Date of Patent: Jun. 17, 2014

(54) APPARATUS AND METHOD FOR MECHANICALLY REDUCING INTERNAL PRESSURE OF COLUMN IN REFINERY OR PETROCHEMICAL PROCESS

(75) Inventor: Chang Hun Na, Goyang-si (KR)

(73) Assignee: Pields Engineering Inc., Seoul (KR)

( * ) Notice: Subject to any disclaimer, the term of this patent is extended or adjusted under 35 U.S.C. 154(b) by 1101 days.

(21) Appl. No.: 12/719,052

(22) Filed: Mar. 8, 2010

(65) Prior Publication Data

US 2010/0288371 A1 Nov. 18, 2010

(30) Foreign Application Priority Data

May 13, 2009 (KR) .................. 10-2009-0041666

(51) Int. Cl.
*F16K 17/04* (2006.01)
(52) U.S. Cl.
USPC .................. 137/456; 137/467; 137/87.01
(58) Field of Classification Search
USPC .............. 137/456, 460, 467, 461, 488, 94, 137/625.18, 87.01, 87.03, 87.04
See application file for complete search history.

(56) References Cited

U.S. PATENT DOCUMENTS

| 196,106 | A | * | 10/1877 | Anderson | ............... 137/488 |
| 4,830,045 | A | * | 5/1989 | Fujikawa et al. | ............. 137/456 |
| 7,289,861 | B2 | | 10/2007 | Aneweer et al. | |

FOREIGN PATENT DOCUMENTS

| JP | 49-063018 A | 6/1974 |
| JP | 62-083575 A | 4/1987 |

OTHER PUBLICATIONS

Office Action issued by the Japanese Patent Office in a corresponding Japanese patent application No. 2010-108912, May 8, 2012.

* cited by examiner

*Primary Examiner* — Kevin Lee
*Assistant Examiner* — Macade Nichols
(74) *Attorney, Agent, or Firm* — Gottlieb, Rackman & Reisman, P.C.

(57) ABSTRACT

Disclosed is an apparatus and method for mechanically reducing internal pressure of a column in a refinery or petrochemical process, which uses a safety relay valve for operating an emergency shutdown valve able to mechanically block the supply of a heat source in the process, thus reducing the mounting cost, simplifying the process and ensuring high reliability thanks to the use of mechanical signals.

5 Claims, 4 Drawing Sheets

APPARATUS AND METHOD FOR MECHANICALLY REDUCING INTERNAL PRESSURE OF COLUMN IN REFINERY OR PETROCHEMICAL PROCESS

CROSS REFERENCE TO RELATED APPLICATION

This application claims the benefit of Korean Patent Application No. 10-2009-0041666, filed May 13, 2009, entitled "The mechanical apparatus and method for reducing pressure in column in refinery or petrochemical process", which is hereby incorporated by reference in its entirety into this application.

BACKGROUND OF THE INVENTION

1. Technical Field

The present invention relates to an apparatus and method for mechanically reducing the internal pressure of a column in a refinery or petrochemical process. More particularly, the present invention relates to an apparatus and method for mechanically reducing the internal pressure of a column in a refinery or petrochemical process, in which, when the internal pressure of the column increases or exceeds a predetermined level, the supply of a heat source is blocked, whereby the internal pressure of the column is maintained at the predetermined level or lower, thus reducing the capacity of a flare stack.

2. Description of the Related Art

Generally, in refinery and petrochemical plants, a flare stack must be essentially mounted. The flare stack is a device for automatically releasing gas from a process column to the atmosphere and burning it so as to prevent explosion of the column when the internal pressure of the process column is abnormally increased due to interruption of the supply of power or cooling water or because of the outbreak of a fire.

In a conventional system, gas is discharged from the column to the atmosphere using a safety valve. Specifically, when the internal pressure of the column exceeds a pressure set for the safety valve, the safety valve opens so that the gas is discharged to the atmosphere, thus reducing the internal pressure of the column, thereby preventing the explosion of the column.

The gas released from the column through the operation of the safety valve is collected into a header line, and passes through a seal drum and a knockout drum for separating and removing a liquid mist, thereby discharging the burned gas to the atmosphere.

However, in the case where the quantity of gas ejected further increases owing to the construction of more production facilities or the replacement of the facilities in order to increase throughput of conventional equipment, it may exceed the design capacity of the flare stack which uses only the above safety valve without using an additional device.

To solve this problem, another flare stack should be additionally provided. Also, in the case where plants are newly constructed, attempts to set the ejection itself to a low level thus reducing the investment cost of the flare stack are made.

Therefore, proposed as an alternative therefor is a safety instrumented system (SIS). A SIS is typical and is commercially available in domestic and foreign countries. This SIS controls the process state using an electrical system such as a computer. U.S. Pat. No. 7,289,861 discloses a system for controlling a process plant using the SIS.

The SIS has been used to reduce the internal pressure of the process column in such a manner that the operating pressure is set to a level equal to or lower than the set pressure of the safety valve, and thus the internal pressure of the column is reduced in advance before operation of the safety valve, so that the amount of gas discharged to the flare stack is decreased, thereby achieving the reduction of the handling capacity of the flare stack.

The SIS includes a pressure sensing system, a TMR (triple modular redundant) controller and an emergency shutdown valve system. FIG. 1 schematically shows the process using the SIS.

With reference to FIG. 1, the SIS is applied to the process in which a light gas of a material heated in the column is discharged through an upper portion of the column, liquefied in a condenser and then transferred to a drum, whereas a heavy component thereof is discharged through a lower portion of the column. In a normal operating state, because the pressure is maintained at a risk level or less, there is no need to operate the safety valve or the SIS.

However, in the case where there occurs an abnormal situation, for example, interruption of the supply of power or cooling water, heat may accumulate in the apparatus attributable to the continuous supply of a heat source such as steam into the column and stopping of the operation of the condenser, undesirably increasing the internal pressure of the column.

In this case, the SIS transmits analog signals to the TMR controller from the pressure sensing system located at the upper portion of the column. When the internal pressure of the column reaches the preset pressure, the TMR controller transmits the signals to the emergency shutdown valve, thus closing the shutdown valve.

Therefore, the pressure of the apparatus is preset to the level equal to or lower than the operating pressure of the safety valve, thus reducing unnecessary flaring. As a result of reducing such unnecessary flaring, an additional need to increase the capacity of the flare stack is obviated, thus achieving cost saving effects and simplifying the plant design.

Although the SIS requires a lower investment than conventional methods, it requires equipment investment due to the purchase of devices. Moreover, in order to certify suitability of this system by an approval authority, reliability equivalent to that of the safety valve should be imparted. However, the SIS does not have high reliability due to the use of electrical signals. Also, because there is a probability of failure of one among ten devices using the SIS, the greatest amount among those amounts of ejected gas is regarded as being ejected. Taking into consideration such an ejected amount, the capacity of the flare stack should be set. So, the reduction effect using the SIS is decreased. This is because the shutdown valve is controlled using electrical signals, undesirably causing problems in which reliability of the SIS does not reach that of the safety valve using mechanical signals.

SUMMARY OF THE INVENTION

Leading to the present invention, intensive and thorough research was carried out by the present inventors for the purpose of solving the problems encountered in the related art, resulting in the finding that, when the internal pressure of a column in a refinery or petrochemical process increases or exceeds a predetermined level, such a pressure increase may be sensed and thus the supply of a heat source to a reboiler may be mechanically blocked, thereby drastically reducing the handling capacity of a flare stack and achieving a reliability equivalent to or higher than that of a safety valve.

Accordingly, the present invention intends to provide an apparatus for mechanically reducing pressure, which includes a safety relay valve for operating an emergency shutdown valve able to mechanically block the supply of a heat source in a refinery or petrochemical process.

The present invention also intends to provide a method of efficiently reducing internal pressure of a column in a refinery or petrochemical process using the above apparatus.

An aspect of the present invention provides an apparatus for mechanically reducing an internal pressure of a column in a refinery or petrochemical process, including an emergency shutdown valve for blocking supply of a heat source to the column, and a safety relay valve for mechanically operating the emergency shutdown valve using the internal pressure of the column.

In this aspect, the safety relay valve may include a hollow valve body having at a lateral wall thereof ventilation ports through which compressed air for operating the emergency shutdown valve flows, a plunger for opening or closing the ventilation ports while moving in the hollow valve body, a spring section connected to one end of the hollow valve body so as to apply pressure to the plunger, and a pressure transfer section connected to the other end of the hollow valve body so as to transfer the internal pressure of the column to the plunger.

In this aspect, the hollow valve body of the safety relay valve may have a fixing pin for fixedly holding the plunger which is moved up, and the plunger may have a pin recess receiving the fixing pin.

In this aspect, the plunger may have a large-diameter portion having a diameter identical to an inner diameter of the hollow valve body and a small-diameter portion having a diameter less than the inner diameter of the hollow valve body, which are able to control the direction of flow of air in the safety relay valve so that the emergency shutdown valve is maintained in an open state before the plunger is moved up, and so that the emergency shutdown valve is maintained in a closed state when the plunger is moved up.

In this aspect, the pressure transfer section may have a disk for pushing up the plunger using the internal pressure of the column, and a discharge pipe which discharges a fluid in the column introduced into the pressure transfer section and is closed to block the discharge of the fluid when the plunger is fixedly held.

Another aspect of the present invention provides a method of mechanically reducing an internal pressure of a column in a refinery or petrochemical process by blocking supply of a heat source to the column, the method including a) introducing a part of a fluid in the column into a safety relay valve, b) operating the safety relay valve by pressure of the introduced fluid, thus changing a direction of flow of compressed air in the safety relay valve, and c) closing an emergency shutdown valve using the changed direction of flow of the compressed air.

In this aspect, the safety relay valve may include a hollow valve body having at a lateral wall thereof ventilation ports through which the compressed air for operating the emergency shutdown valve flows, a plunger for opening or closing the ventilation ports while moving in the hollow valve body, a spring section connected to one end of the hollow valve body so as to apply pressure to the plunger, and a pressure transfer section connected to the other end of the hollow valve body so as to transfer the internal pressure of the column to the plunger.

In this aspect, the method may include fixedly holding the plunger using a fixing pin and a pin recess respectively formed in the hollow valve body and the large-diameter portion of the plunger when the plunger is moved up.

In this aspect, the method may include controlling opening or closing of the ventilation ports while moving the plunger in the hollow valve body, the plunger having a large-diameter portion having a diameter identical to an inner diameter of the hollow valve body and a small-diameter portion having a diameter less than the inner diameter of the hollow valve body.

In this aspect, the method may include disposing the large-diameter portion and the small-diameter portion so that the compressed air is introduced into the emergency shutdown valve through the ventilation ports before the plunger is moved up, and disposing the large-diameter portion and the small-diameter portion so that the compressed air introduced into the emergency shutdown valve is discharged to outside when the plunger is moved up.

In this aspect, the method may include discharging the fluid in the column through the discharge pipe of the pressure transfer section, and blocking discharge of the fluid by closing the discharge pipe when the plunger which is moved up is fixedly held.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Hereinafter, a detailed description will be given of embodiments of the present invention with reference to the accompanying drawings.

Furthermore, the terms and words used in the present specification and claims should not be interpreted as being limited to typical meanings or dictionary definitions, but should be interpreted as having meanings and concepts relevant to the technical scope of the present invention based on the rile according to which an inventor can appropriately define the concept implied by the term to best describe the method he or she knows for carrying out the invention.

The present invention provides an apparatus for closing an emergency shutdown valve so as to block the supply of a heat source into a reboiler when the internal pressure of a column reaches a predetermined level, using a safety relay valve which has a simple configuration and also has high reliability, in lieu of a conventional SIS.

Figure 1:
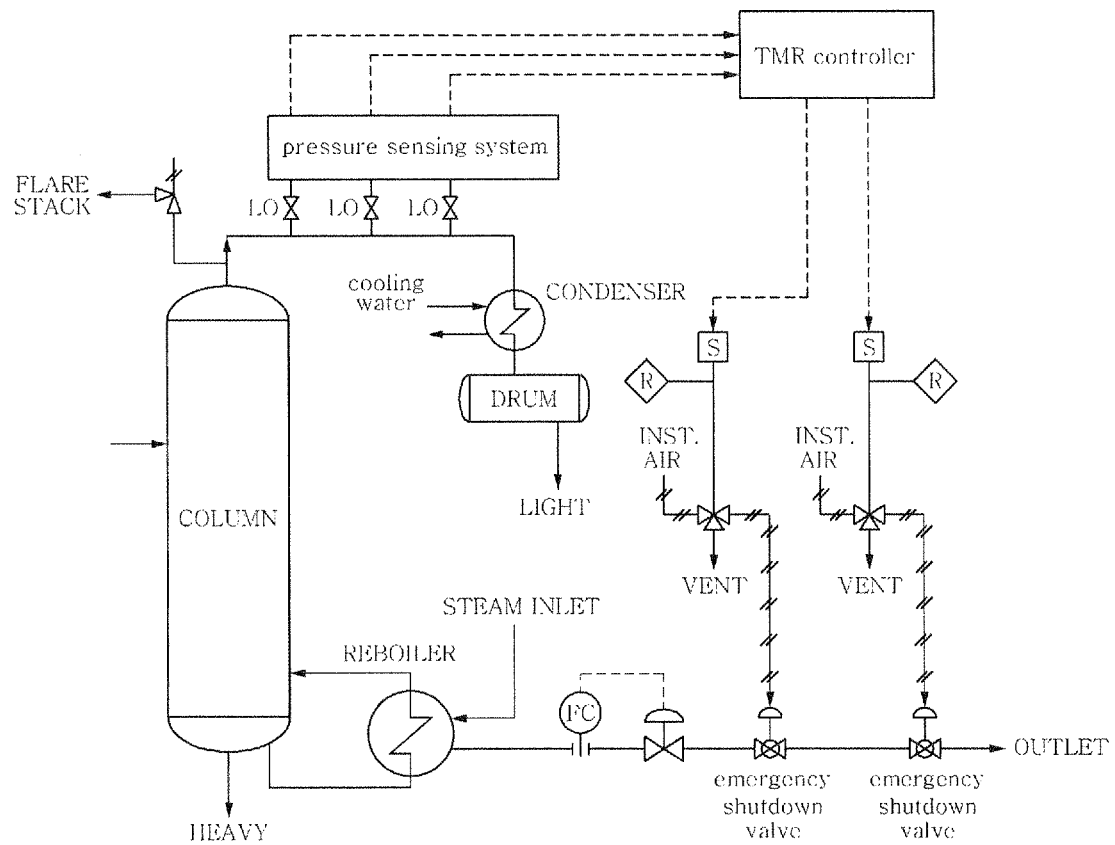
FIG. 1 schematically shows a conventional process using a SIS.
Figure 2A:
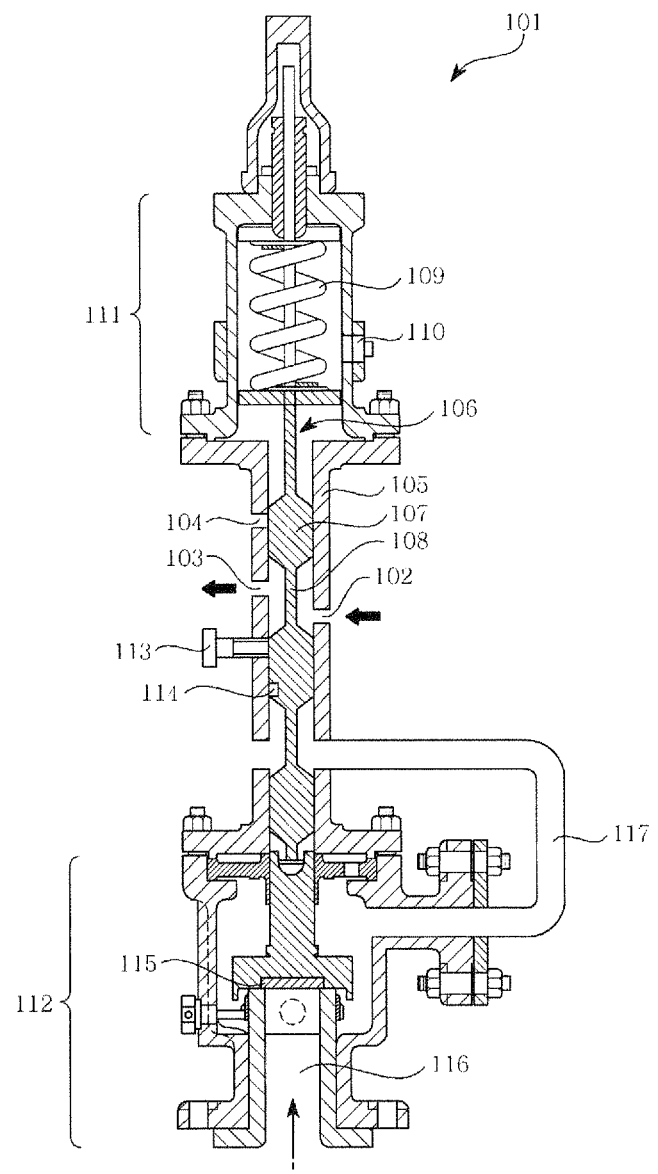
FIGS. 2A schematically shows a safety relay valve according to the present invention, in a normal pressure state.
Figure 2B:
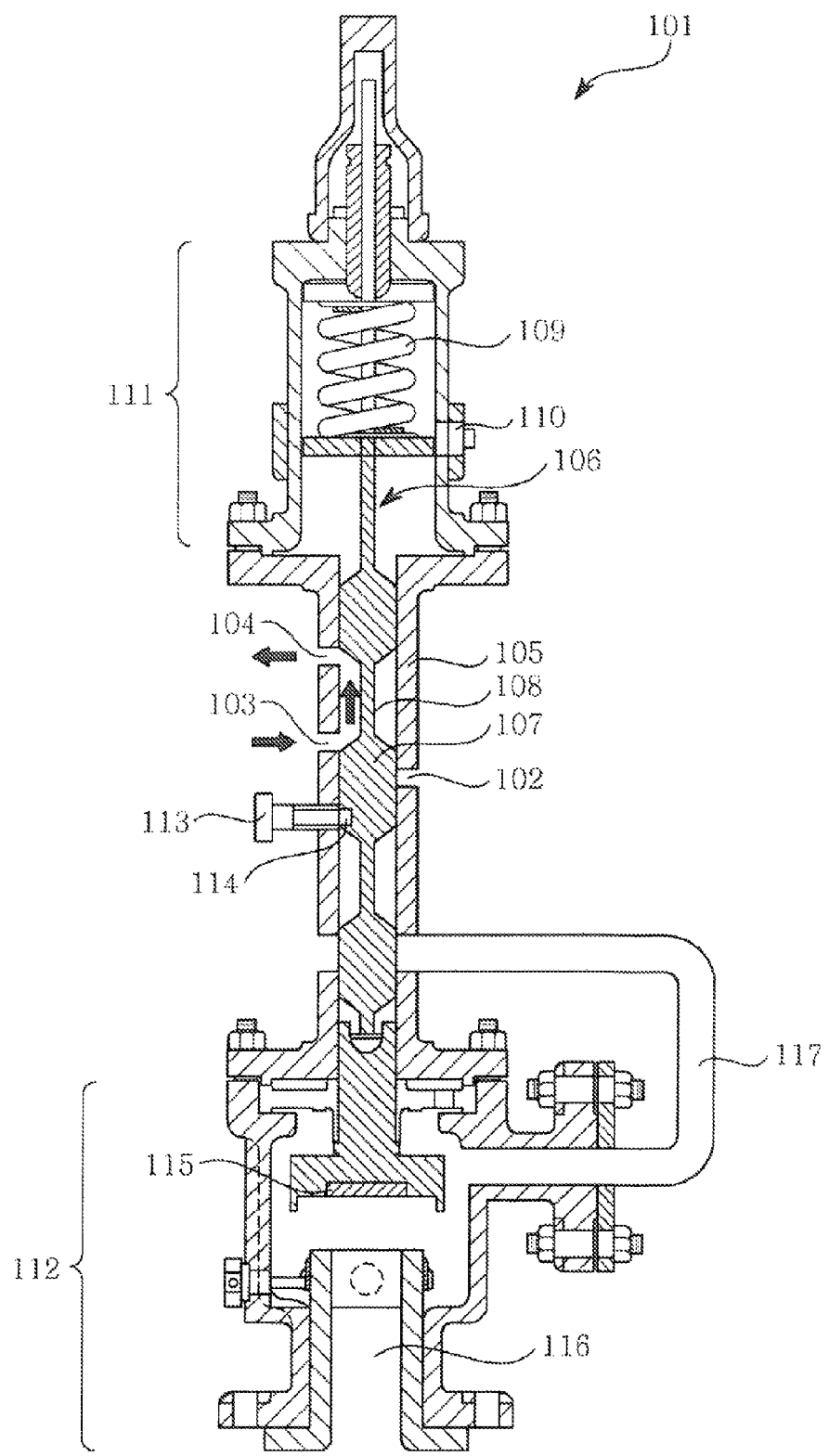
FIG. 2B schematically shows the safety relay valve according to the present invention, in a pressure increased state.

FIGS. 2A and 2B respectively show the safety relay valve according to the present invention under conditions of the internal pressure of the column in a normal state and an abnormal state when using an air-to-open type emergency shutdown valve.

The safety relay valve 101 of FIG. 2A includes a hollow valve body 105 having ventilation ports, including a compressed air inlet port 102, a compressed air outlet port 103 and a compressed air vent 104, which enable the flow of a fluid and are able to determine opening or closing of the emergency shutdown valve. Also, the safety relay valve includes a plunger 106 for controlling the opening or closing of the ventilation ports while moving in the hollow valve body 105, and a spring section 111 having a spring 109 and connected to the upper portion of the hollow valve body 105 so as to apply pressure to the plunger 106. Further provided is a pressure transfer section 112 connected to the lower portion of the hollow valve body 105 so as to transfer the internal pressure of the process column to the plunger 106.

The spring 109 has a set pressure value lower than that of a safety valve provided in the process apparatus. This is to prevent the pressure from additionally increasing thanks to the operation of a pressure relief device before the operation of the safety valve, thereby blocking the flow of gas from the process column to the safety valve.

The spring section 111 may further have a vent 110 for discharging air so that the pressure set by the spring 109 is not increased due to the compression of the spring section 111.

The plunger 106 has a large-diameter portion 107 in close contact with an inner wall of the hollow valve body 105 to thus close the ventilation ports and a small-diameter portion 108 having a diameter less than that of the large-diameter portion 107 to enable the passing of a fluid, so as to discharge the compressed air introduced for controlling the opening or closing of the emergency shutdown valve or block the discharge thereof.

As the plunger 106 has the large-diameter portion 107 and the small-diameter portion 108, the direction of flow of the compressed air introduced into the safety relay valve may change in response to the increase in the internal pressure of the process apparatus.

In the case where the pressure of the process column is normal, the small-diameter portion 108 of the plunger 106 is located at positions of the compressed air inlet port 102 and the compressed air outlet port 103, so that the compressed air is introduced into the emergency shutdown valve (not shown) and thus a pipe for supplying a heat source is opened.

In the case where the internal pressure of the process column is normal, the compressed air vent 104 may be closed by the large-diameter portion 107 of the plunger 106, as shown in the drawing.

When the pressure of the process apparatus is normal in this way, the compressed air is introduced into the emergency shutdown valve through the safety relay valve 101, and thus the valve is maintained in an open state. Hence, the normal operation of the process apparatus is not affected thereby.

In this case, the emergency shutdown valve may be of an air-to-open type.

Also provided in the hollow valve body 105 is a fixing pin 113 for fixedly holding the plunger 106 which is moved up to a predetermined height, and a pin recess 114 receiving the fixing pin may be formed in the large-diameter portion 107 of the plunger 106.

Connected to the lower end of the plunger 106 is the pressure transfer section 112. The pressure transfer section 112 includes a disk 115 for pushing up the plunger 106.

When the fluid in the process column is introduced into a fluid introduction pipe 116 located under the disk 115 and thus is subjected to pressure equal to or exceeding the pressure set by the spring 109, it pushes up the disk 115, whereby the plunger 106 is moved up.

Also, a discharge pipe 117 may be provided to discharge the fluid from the pressure transfer section 112 to the outside.

FIG. 2B shows the safety relay valve 101 when the internal pressure of the process column is increased to a level equal to or exceeding the set pressure of the safety relay valve 101.

As shown in FIG. 2B, as the pressure of the fluid in the process column is increased, the disk is pushed up and thus the plunger 106 is moved up. Accordingly, the positions of the large-diameter portion 107 and the small-diameter portion 108 of the plunger 106 are changed.

In this case, the large-diameter portion 107 is located at a position of the compressed air inlet port 102 at which the small-diameter portion 108 of the plunger 106 was located in a normal state, thus blocking the introduction of the compressed air.

Furthermore, the small-diameter portion 108 is located still at a position of the compressed air outlet port 103 through which the compressed air is introduced into the emergency shutdown valve, but the small-diameter portion 108 is located at a position of the compressed air vent 104.

In this case, the compressed air which is introduced into the emergency shutdown valve to thus make the emergency shutdown valve open is discharged out of the compressed air vent 104 through the compressed air outlet port 103. Thereby, the pressure due to the compressed air introduced into the emergency shutdown valve is lost, so that the emergency shutdown valve is closed, thus blocking the supply of the heat source to the process apparatus.

When the plunger 106 is moved up, the fixing pin 113 of the hollow valve body 105 is fitted into the pin recess 114 formed in the large-diameter portion 107 of the plunger 106 by using the spring or the like. Accordingly, the plunger 106 is fixedly held in a state of being moved up after reaching the predetermined pressure.

In the absence of the fixing pin 113, the plunger 106 may be continuously moved up and down depending on changes in the pressure. In this case, an engineer may notice problems caused in the process apparatus too late. After removal of a factor causing the increase in the pressure, the fixing pin 113 is manually eliminated, whereby the plunger 106 is moved down to its original position. Like this, the safety relay valve may be converted into a normal operation mode.

Also, the discharge pipe 117 of the pressure transfer section 112 may be closed by the large-diameter portion 107 of the plunger 106 at the point of time that the plunger which is moved up is fixedly held, thus preventing the process fluid from being additionally discharged to the outside.

In the present invention, the electrical apparatus of the conventional SIS requiring a plurality of devices may be simply replaced with the safety relay valve, thus obtaining the same operation performance as when using the SIS, thereby reducing the mounting cost and simplifying the process.

Furthermore, the signal system directly uses not electrical signals as in the conventional SIS but mechanical signals, thus ensuring high reliability.

Figure 3:
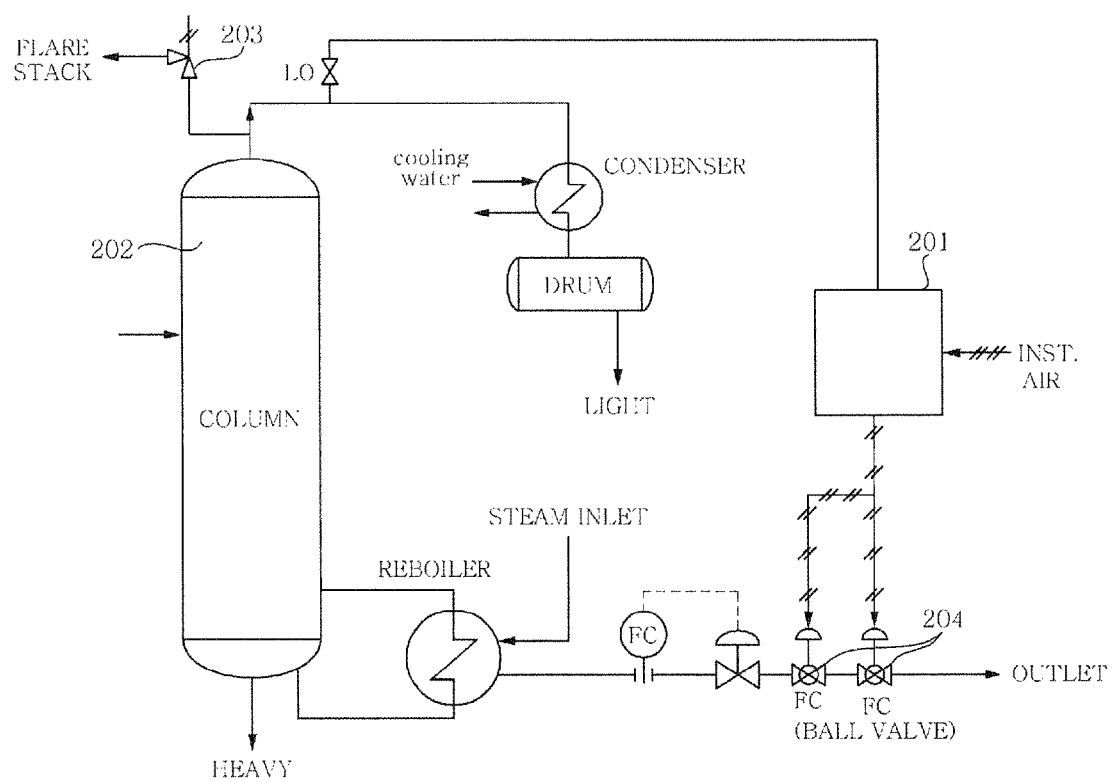
FIG. 3 schematically shows a process according to the present invention.

FIG. 3 schematically shows the process according to the present invention. With reference to FIG. 3, when the pressure of a column 202 is increased to a predetermined level or exceeds that level, a safety valve 203 is opened so that the fluid is discharged from the column to a flare stack, thus reducing the internal pressure of the column.

As mentioned above, however, the case where there is no additional pressure control system or where the conventional SIS is applied undesirably causes the problem in which the capacity of the flare stack is enlarged.

In the method according to the present invention, unlike the conventional SIS using electrical signals, the internal pressure of the column is directly mechanically measured as in the operating principle of the safety valve, thus exhibiting high reliability, effectively resulting in reduced capacity of the flare stack and decreased costs.

As shown in FIG. 3, in order to measure the internal pressure of the column 202, the column is connected with a pipe so that part of the fluid is guided to flow from the column to the safety relay valve 201. When the pressure of the fluid thus guided is equal to or exceeds the predetermined level, the safety relay valve 201 is operated to thus change the direction of flow of the compressed air in the safety relay valve 201. Whether the emergency shutdown valve 204 is closed is determined by the changed flow of the compressed air. When the emergency shutdown valve 204 is closed, the supply of the heat source to the column 202 is stopped, thus preventing the internal pressure of the column 202 from increasing.

In this case, the set pressure of the safety relay valve 201 may be determined to be equal to or lower than the set pressure of the safety valve 203. Only when the set pressure of the safety relay valve 201 is lower than the set pressure of the safety valve 203, can the pressure of the column 202 be reduced before operation of the safety valve 203, thereby decreasing the incidence rate of unnecessary operation of the safety valve 203.

The above safety relay valve 201 may be a safety relay valve composed of a hollow valve body having at the lateral wall thereof ventilation ports through which the compressed air for operating the emergency shutdown valve 204 flows, a plunger for opening or closing the ventilation ports while moving in the hollow valve body, a spring section connected to one end of the hollow valve body to apply pressure to the plunger, and a pressure transfer section connected to the other end of the hollow valve body to transfer the internal pressure of the column to the plunger. The safety relay valve 201 may control the direction of flow of the compressed air along the movement of the plunger by the guided fluid in the column 202.

In the method according to the present invention, the direction of flow of the compressed air is determined by controlling the opening or closing of the ventilation ports along the movement of the plunger in the hollow valve body, in which the plunger has the large-diameter portion having the same diameter as the inner diameter of the hollow valve body and the small-diameter portion having a diameter less than the inner diameter of the hollow valve body. When the internal pressure of the apparatus is in a normal state, the safety relay valve 201 is configured such that the emergency shutdown valve is maintained open by the flow of the compressed air into the safety relay valve 201. For example, in the case where the emergency shutdown valve is of an air-to-open type, the compressed air is introduced into the emergency shutdown valve 204, so that the emergency shutdown valve 204 mounted in the pipe for supplying the heat source to the column 202 is maintained open. However, if the internal pressure of the column is equal to or exceeds the predetermined pressure value, the direction of flow of the compressed air passing through the safety relay valve 201 is changed so that the compressed air introduced into the emergency shutdown valve 204 is discharged to the outside, thus closing the emergency shutdown valve 204.

Also, in the case where the internal pressure of the column 202 is increased, the plunger of the safety relay valve 201 may be fixedly held in a state of being moved up using the fixing pin and the pin recess respectively formed in the hollow valve body and the plunger. As mentioned above, in the case where the plunger which is moved up is not fixedly held in that state, there may be the problem of the process continuing because of the presence of a factor which increases the pressure.

When the set pressure of the safety relay valve 201 is determined to be lower than the set pressure of the safety valve 203, the supply of the heat source is blocked in advance before the safety valve is opened and the fluid is discharged thereby to the flare stack, thus preventing the discharge of the fluid to the flare stack through the safety valve. Through this operation, as the discharge of the fluid is reduced, the investment cost may be decreased and the process design may be simplified.

In the method according to the present invention, the guided fluid in the column is introduced into the safety relay valve 201 while moving up the plunger in response to the increase in the pressure. As such, the guided fluid is discharged to the outside through the discharge pipe formed in the safety relay valve 201. Also, the discharge of the fluid may be blocked by closing the discharge pipe when the plunger which is moved up is fixedly held. This is to prevent the fluid in the column 202 from being excessively discharged to the outside on the condition that the discharge pipe is continuously open.

As described hereinbefore, the present invention provides an apparatus and method for mechanically reducing internal pressure of a column in a refinery or petrochemical process. Compared to a conventional SIS requiring the cost of about one hundred million won, the apparatus according to the present invention using a safety relay valve needs entails a cost of about thirty million won. Thus, in the case where the apparatus according to the present invention using the safety relay valve is employed, the cost can be reduced by about 73% compared to when using the conventional SIS.

Also, the apparatus according to the present invention does not require complicated equipment as in the conventional SIS, resulting in relatively low mounting cost and a simplified process.

Unlike the conventional SIS using electrical signals at high cost, the apparatus according to the present invention uses mechanical signals and thus can exhibit high reliability even at low cost.

Furthermore, because the apparatus according to the present invention is operated in a manner similar to that of a safety valve, it is not subjected to the probability of failure of individual devices, which is applied to the conventional SIS by an approval authority, thereby obtaining effects of maximizing the reduction of an ejected amount.

Although the embodiments of the present invention have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. An apparatus for mechanically reducing an internal pressure of a column in a refinery or petrochemical process, comprising:
   an emergency shutdown valve for blocking supply of a heat source to the column positioned between a heat source and the column; and
   a safety relay valve for mechanically operating the emergency shutdown valve using the internal pressure of the column connected with a emergency shutdown valve and the column through a pipe,
   wherein the safety relay valve comprises a hollow valve body having at a lateral wall thereof ventilation ports through which compressed air in the column for operating the emergency shutdown valve flows, a plunger for opening or closing the ventilation ports with the compressed air while moving in the hollow valve body, a spring section having a predetermined pressure value being lower than that of the safety relay valve provided in the apparatus and connected to one end of the hollow valve body so as to apply pressure to the plunger, and a pressure transfer section connected to the other end of the hollow valve body so as to transfer the internal pressure of the column to the plunger.

2. The apparatus as set forth in claim 1, wherein the plunger has a large-diameter portion having a diameter identical to an inner diameter of the hollow valve body and a small-diameter portion having a diameter less than the inner diameter of the hollow valve body, so as to control opening or closing of the ventilation ports while moving in the hollow valve body.

3. The apparatus as set forth in claim 1, wherein the hollow valve body of the safety relay valve has a fixing pin for fixedly holding the plunger which is moved up.

4. The apparatus as set forth in claim 2, wherein the large-diameter portion and the small-diameter portion of the plunger are disposed so that the compressed air is introduced into the emergency shutdown valve through the ventilation ports before the plunger is moved up, and are disposed so that the compressed air introduced into the emergency shutdown valve is discharged to an atmosphere when the plunger is moved up.

5. The apparatus as set forth in claim 1, wherein the pressure transfer section has a disk for pushing up the plunger using the internal pressure of the column, and a discharge pipe for discharging a fluid in the column introduced into the pressure transfer section.

* * * * *